United States Patent
Havdan et al.

(10) Patent No.: US 12,288,562 B2
(45) Date of Patent: Apr. 29, 2025

(54) SYSTEM AND METHOD FOR SPOOFING DETECTION

(71) Applicant: NICE Ltd., Ra'anana (IL)

(72) Inventors: Borys Havdan, Vinnytsia (UA); Gennadi Lembersky, Ra'anana (IL); Yevhenii Lukin, Vinnytsia (UA)

(73) Assignee: Nice Ltd., Ra'anana (IL)

( * ) Notice: Subject to any disclaimer, the term of this patent is extended or adjusted under 35 U.S.C. 154(b) by 704 days.

(21) Appl. No.: 17/562,796

(22) Filed: Dec. 27, 2021

(65) Prior Publication Data

US 2023/0206925 A1 Jun. 29, 2023

(51) Int. Cl.
*G10L 17/04* (2013.01)
*G06N 3/04* (2023.01)
*G06N 3/08* (2023.01)
*G10L 17/02* (2013.01)

(52) U.S. Cl.
CPC .............. *G10L 17/04* (2013.01); *G06N 3/04* (2013.01); *G06N 3/08* (2013.01); *G10L 17/02* (2013.01)

(58) Field of Classification Search
CPC ......... G10L 17/18; G10L 25/51; G10L 25/30; G10L 17/04; G10L 17/02; G06F 18/22; G06F 18/214; G06F 17/12; G07C 5/0808; G05B 19/41835; Y02T 90/00

USPC ........................................................ 704/200
See application file for complete search history.

(56) References Cited

U.S. PATENT DOCUMENTS

| | | | |
|---|---|---|---|
| 11,049,011 B2 * | 6/2021 | Jayadeva | G06F 17/12 |
| 2021/0295175 A1 * | 9/2021 | Kennel | G06F 18/214 |
| 2022/0092428 A1 * | 3/2022 | Sun | Y02T 90/00 |
| 2023/0132127 A1 * | 4/2023 | Vanderheyden | G06F 18/22 706/15 |

FOREIGN PATENT DOCUMENTS

CN 111767983 A * 10/2020

\* cited by examiner

*Primary Examiner* — Md S Elahee
(74) *Attorney, Agent, or Firm* — PEARL COHEN ZEDEK LATZER BARATZ LLP

(57) ABSTRACT

A system and method for classification of voice samples to genuine voice samples or spoofing voice samples may include: extracting a set of features from each of a plurality of voice samples, each voice sample labeled as genuine or spoof; training a neural network having a plurality of nodes organized into layers, with links between the nodes, wherein each link comprises a weight, with the sets of features, by adjusting at least one of the weights using a loss function that comprises a regulation factor, wherein the regulation factor is set to zero for voice samples labeled as genuine and is proportional to the prediction of the neural network for data samples labeled as spoofing.

20 Claims, 6 Drawing Sheets

SYSTEM AND METHOD FOR SPOOFING DETECTION

FIELD OF THE INVENTION

The present invention relates generally to spoofing (e.g., pretending to be another person; pretending that an automated device is a human, etc.) detection technology, and more specifically, to technology for detecting spoofing attempts against a call center or other entity.

BACKGROUND OF THE INVENTION

Fraudsters may use various methods to attack voice biometric systems and call centers. For example, playback attack may include using recorded audio (instead of live speech) in an attempt to seem to be an innocent caller, and synthetic speech attacks may use various algorithms to generate speech from scratch to try and spoof systems. Spoofing techniques have become so sophisticated that sometimes it is hard for a human operator to distinguish between real and spoof speech. For example, voice generated by current text to speech algorithms can be practically indistinguishable from human speech.

Currently available spoofing detection solutions are typically developed using academic or synthetic data instead of real-world recordings, which leads to poor performance when tested on real world recordings. In addition, these solutions may be fitted to a single type of codec (encoder and a decoder) and require large audio samples for analysis.

Thus, an automatic method for spoofing detection, that would operate well in real world scenarios and would require shorter audio samples, is desired.

SUMMARY OF THE INVENTION

A computer-based system and method for classification of data samples to a first class or a second class may include: providing a neural network with data samples, each labeled as pertaining to the first class or the second class, wherein the neural network may include a plurality of nodes organized into layers, with links between the nodes, wherein each link comprises a weight; and training the neural network by adjusting at least one of the weights using a loss function that comprises a regulation factor, wherein the regulation factor may be set to zero for data samples labeled as pertaining to the first class and may be proportional to the prediction of the neural network for data samples labeled as pertaining to the second class.

According to embodiments of the invention, the regulation factor may be directly proportional to the prediction of the neural network for data samples labeled as pertaining to the second class.

According to embodiments of the invention, the regulation factor may be inversely related to the prediction of the neural network for data samples labeled as pertaining to the second class.

According to embodiments of the invention, the data samples may include features extracted from voice samples.

According to embodiments of the invention, the first class may be genuine voice samples, and the second class may be spoofing voice samples.

According to embodiments of the invention, extracting the features may include: obtaining a voice sample; detecting speech in the voice sample; removing parts of the voice sample that do not include speech; dividing the voice sample into partially overlapping frames; extracting frequency-based features from the frames; applying convolutional layers on the frequency-based features; and unifying the results of the convolutional layers to obtain the set of features.

According to embodiments of the invention, unifying results of the convolutional layers may be performed by recurrent layers.

According to embodiments of the invention, the neural network may include fully connected layers.

According to embodiments of the invention, training the neural network may include performing dropout on the fully connected layers.

Embodiments of the invention may include obtaining a new sample; and obtaining a classification of the new sample to one of the first class or the second class by providing the new sample to the trained neural network.

A computer-based system and method for classification of voice samples to genuine voice samples or spoofing voice samples may include: extracting a set of features from each of a plurality of voice samples, each voice sample labeled as genuine or spoof; training a neural network having a plurality of nodes organized into layers, with links between the nodes, where each link may include a weight, with the sets of features, by adjusting at least one of the weights using a loss function that may include a regulation factor, where the regulation factor may be set to zero for voice samples labeled as genuine and may be proportional to the prediction of the neural network for data samples labeled as spoofing.

According to embodiments of the invention, extracting the features may include: detecting speech in the voice sample; removing parts of the voice sample that do not include speech; dividing the voice sample into partially overlapping frames; extracting frequency-based features from the frames; applying convolutional layers on the frequency-based features; and unifying the results of the convolutional layers to obtain the set of features.

Embodiments of the invention may include obtaining a new voice sample; extracting a set of features from the new voice sample; and classify the new voice sample by providing the set of features of the new voice sample to the trained neural network.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
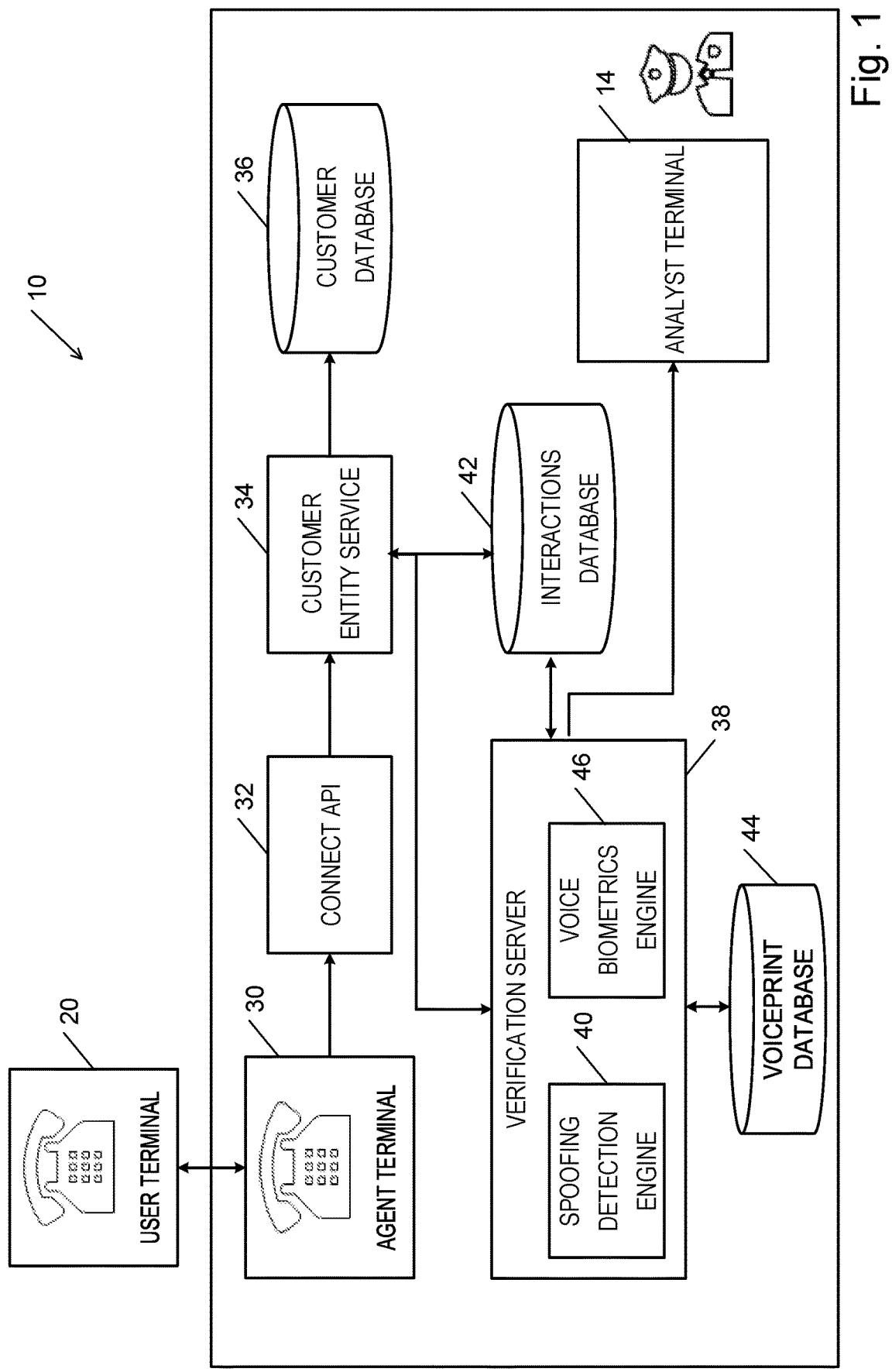
FIG. 1 depicts a schematic illustration of a call center and a spoofing detection system, according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention may provide an automatic method for spoofing detection. Embodiments of the invention may train a neural network (NN) model, or a deep learning (DL) NN model, for classifying input voice samples into genuine voice samples or spoofed voice samples, based on an input voice sample of as little as, in some embodiments three seconds of net voice recording (other amounts may be used). According to embodiments of the invention, a regulation factor may be added to a loss function used for training the NN model. The regulation factor may equal zero for voice samples labeled as genuine and may be proportional to the prediction of the neural network for data samples labeled as being spoofed or fake samples. Thus, the regulation factor and loss function may be biased, and embodiments of the invention may adjust the model weights more significantly for a false negative classification (e.g., a spoof call that is classified as genuine) comparing to the adjustments to the model weights made after false positive classification (e.g., a genuine call that is classified as spoof, fake, imposter, etc.). Thus, embodiments of the invention may require smaller training datasets, with shorter voice recording and provide more accurate results compared to the prior art.

According to embodiments of the invention, if the model misclassifies a spoofed interaction as genuine, that means that the system may authenticate an imposter as a genuine caller. An authenticated imposer may cause serious damage to the organization, for example, an authenticated imposer may take over an account. On the other hand, if the model misclassifies a genuine interaction as spoofed interaction, then in most cases the interaction will be transferred to a human agent that may check the interaction and corrected to genuine caller. Therefore, embodiments of the invention may treat a false positive classification differently than a false negative classification. This may be achieved by adding the biased regulation factor to a loss function used for training the NN model. Using the biased regulation factor may cause the loss function to adjust the model to reduce the probability of spoofed call identified as genuine, even if some genuine calls will be marked as spoofed.

By providing automatic spoofing detection, embodiments of the invention may improve the technology of spoofing detection and the technology of call centers. In addition, by using a biased regulation factor, embodiments of the invention may improve the technology of machine learning (ML), and specifically the technology of deep learning neural networks.

A neural network may include fully connected layers including neurons or nodes organized into layers, with links between neurons transferring output between neurons. Aspects of a NN may be weighed, e.g., links may have weights, and training may involve adjusting weights. A NN may be executed and represented as formulas or relationships among nodes or neurons, such that the neurons, nodes or links are "virtual", represented by software and formulas, where training or executing a NN is performed by for example a conventional computer or GPU. A DL NN model may include other types of layers and operations, with learnable weights (e.g., parameters and filters) such as convolutional layers, residual blocks, recurrent layers, leaky rectified linear units (Leaky ReLu), etc.

An interaction may be a conversation or exchange of information between two or more people, for example a speaker or caller, e.g., a customer, person or fraudster on the one hand, and a call center agent or another person on the other hand. An interaction may be for example a telephone call or a voice over Internet Protocol (VoIP) call. An interaction may describe both the event of the conversation and also the data associated with that conversation, such as an audio recording of the conversation and metadata. Metadata describing an interaction may include information beyond the exchange itself: metadata may include for example the telephone number of the customer or fraudster (e.g. gathered via ANI, automatic number identification), an internet protocol (IP) address associated with equipment used by the speaker or fraudster, account information relevant to or discussed in the interaction, the purported name or identification (ID) of the person, audio information related to the interaction such as background noise, and other information.

While embodiments of the invention will be described herein with relation to a call center, this is not limiting and embodiments of the invention may be used in other scenarios where spoofing needs to be detected in voice recordings, and in other applications.

FIG. 1 depicts a schematic illustration of a call center and spoofing detection system, according to embodiments of the invention. Call center 10 may include one or more agent terminals 30 used by agents to communicate with callers, speakers (e.g., legitimate users and fraudsters, variously) operating user terminals 20 during interactions; and one or more analyst terminals 14, used by security officers, analysts, or other personnel to analyze data output by call center 10 and to input data or feedback, or control the process. Data such as interaction data (e.g., audio recordings and metadata) may be recorded and stored in interaction database 42 and in other systems described.

During an interaction, agent terminal 30 may send a customer unique identifier (ID) for resolution through connect application programming interface (API) server 32. The unique ID may be provided in any applicable manner, for example the unique ID may include the phone number of the caller that may be detected by agent terminal 30, an ID that the caller provides to the agent and the agent inputs to the agent terminal 30, etc. Connect API server 32 may resolve the customer, e.g., identify whether this customer is known to call center 10 or new, via customer entity service 34, which may communicate with the customer database 36. Customer database 36 may store customer details including customers' IDs. Customer entity service 34 may verify the customer ID against the customer details stored in customer database 36. Connect API server 32 may store the interaction data, including audio recording of the interaction, the customer ID, and other metadata as required, in interaction database 42.

In some embodiments, enrollment or verification of callers may start once the interaction has ended and was archived in interaction database 42. This is not mandatory, and in some embodiments, verification may start during the interaction, using audio recording of an initial part of the interaction. Verification server 38 may read interaction data, including the audio recording and metadata from interaction database 42. Verification server 38 may check the audio recording of a speaker part of the interaction for spoofing using spoofing detection engine 40, and may generate or create a voiceprint for the interaction using a voice biometrics engine 46. Verification server 38 may store the voiceprint in voiceprint database 44. Verification server 38 may update analyst terminal 14 with the results of the spoofing detection.

Spoofing detection engine 40 may check the audio recording of a speaker part of the interaction (e.g., the part of the interaction not attributed to the agent of call center 10) for spoofing as disclosed herein. For example, spoofing detection engine 40 may obtain a data sample such as a voice sample, e.g., taken from the audio recording of a speaker part of the interaction, extract a set of features (e.g., organized as a feature matrix or a feature vector) from the voice sample, and provide or input the set of features of the voice sample to a trained neural network model (or DL NN model) to obtain a classification of the voice sample to spoofing (e.g. fake, not the person it purports to be from, or not from a real person) or genuine (e.g. from a live person, or from the person it purports to be from).

According to some embodiments, spoofing detection engine 40 or other components within or outside of system 10 may train the neural network model used by spoofing detection engine 40. Training of the neural network model may include obtaining a plurality of voice samples, each labeled as genuine or spoof, extracting a set of features from each the voice samples, and training the neural network model with the set of features by adjusting at least one of the weights, parameters or filters of the neural network model using a loss function that includes a regulation factor, where the regulation factor is set to zero for voice samples labeled as genuine and is proportional to the prediction of the neural network for data samples labeled as spoof.

Voice biometrics engine 46 may generate a voiceprint (also referred to as a voice signature) of a speaker part of an interaction. The voiceprint may be generated from the voice recording of the speaker part of the and may include features of the voice of the speaker. A voiceprint may be a spectrogram, or acoustic frequency spectrum of a voice, or a vector (an ordered series of numbers) of, for example, 400 numbers, typically stored in digital form. The numbers in the vector may represent attributes of the person's voice. A voiceprint may be a vector (e.g., an i-vector or other vector) of voice biometric attributes. A voiceprint may be unique to a single person and may be used as an identification method, for example, by comparing or otherwise matching voiceprints.

Figure 9:
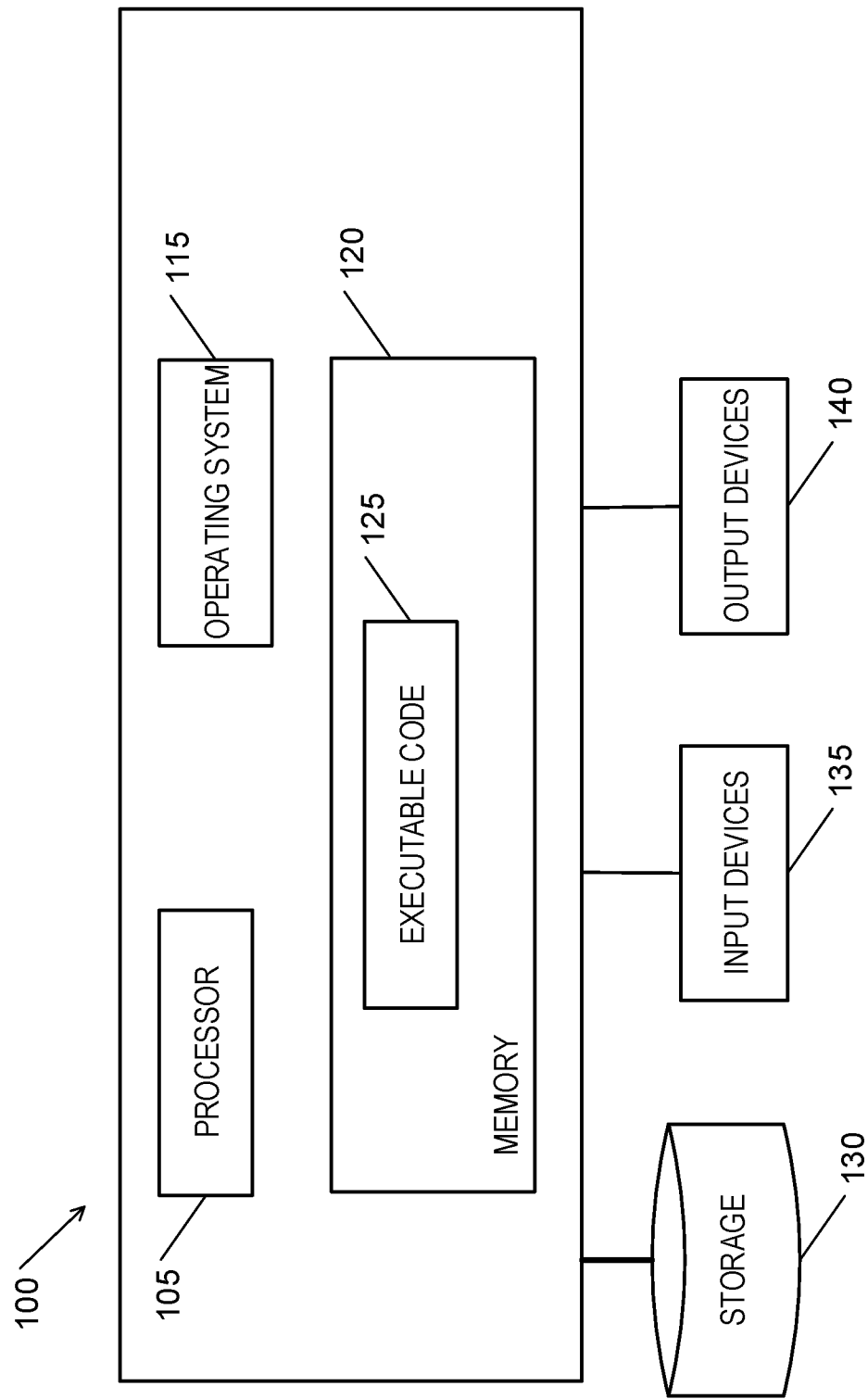
FIG. 9 shows a high-level block diagram of an exemplary computing device according to some embodiments of the present invention.

User terminal 20, agent terminal 30 and analyst terminal 14, verification server 38, as well as other components of FIG. 1 may include computing or telecommunications devices such as personal computers or other desktop computers, conventional telephones, cellular telephones, portable or tablet computers, smart or dumb terminals, etc., and may include some or all of the components such as a processor shown in FIG. 9.

Figure 2:
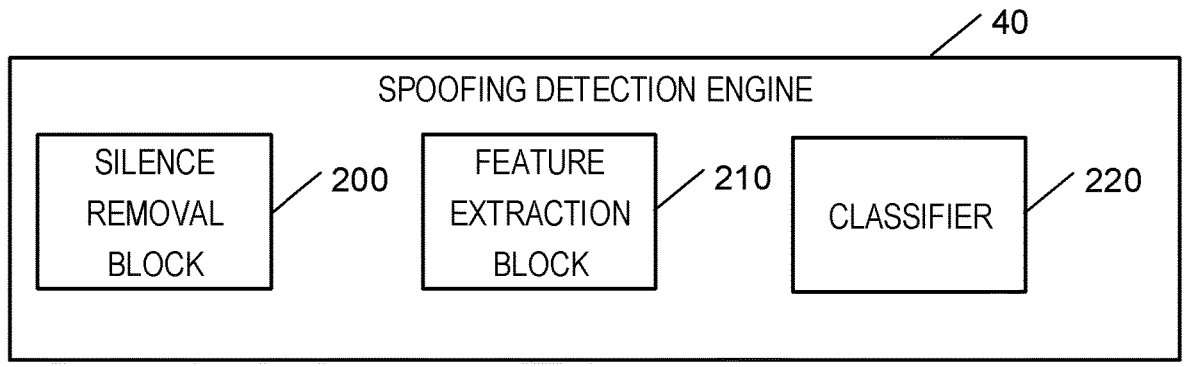
FIG. 2 is a schematic illustration of spoofing detection engine, according to embodiments of the present invention.

Reference is now made to FIG. 2, which is a schematic illustration of spoofing detection engine 40, according to embodiments of the present invention. Spoofing detection engine 40 may include silence removal block 200, feature extractor 210 and classifier 220, which may be a NN. Silence removal block 200 may remove silent periods, or periods that do not contain speech, from the voice sample, for example using voice activity detector (VAD), as known in the art. Using embodiments of the invention, a voiced sample with as little as three seconds of voice, or other durations, may be sufficient for detecting spoofing calls. Silence removal block 200 may generate net-speech samples of three seconds or longer from the voice sample. Silence removal block 200 may provide an indication, e.g., to analyst terminal 14, in case the voice sample does not include enough speech, e.g., in case the net-speech sample is shorter than a threshold duration, e.g., three seconds or other durations. Other threshold durations may be used.

Feature extraction block 210 may extract features from the net-speech sample, as disclosed herein. Typically, the features may be provided in a matrix of 90×1025 features, however, other sizes and formats may be used. According to some embodiments, feature extraction block 210 may divide the voice sample into partially overlapping frames, extract frequency-based features from the frames, apply convolutional layers on the results of the frequency-based features, and unify the results of the convolutional layers to obtain a set of features. In some embodiments, unifying results of the convolutional layers may be performed by recurrent layers. Other features may be used.

Classifier block 220 may be or may include a trained deep learning neural network (DL NN). Classifier block 220 may obtain the features from feature extraction block 210 and perform inference on the neural network. Inference on the neural network may provide a score, indicative of the chances of the call or interaction being genuine or spoof. The score may be compared to a threshold. If the score satisfies a threshold (e.g., is above or below the threshold, depending on the labeling scheme), it may be determined or concluded that the call is genuine, otherwise, it may be determined that spoofing is detected. Typically, the higher the score the more likely that audio is real or genuine speech.

Figure 3:
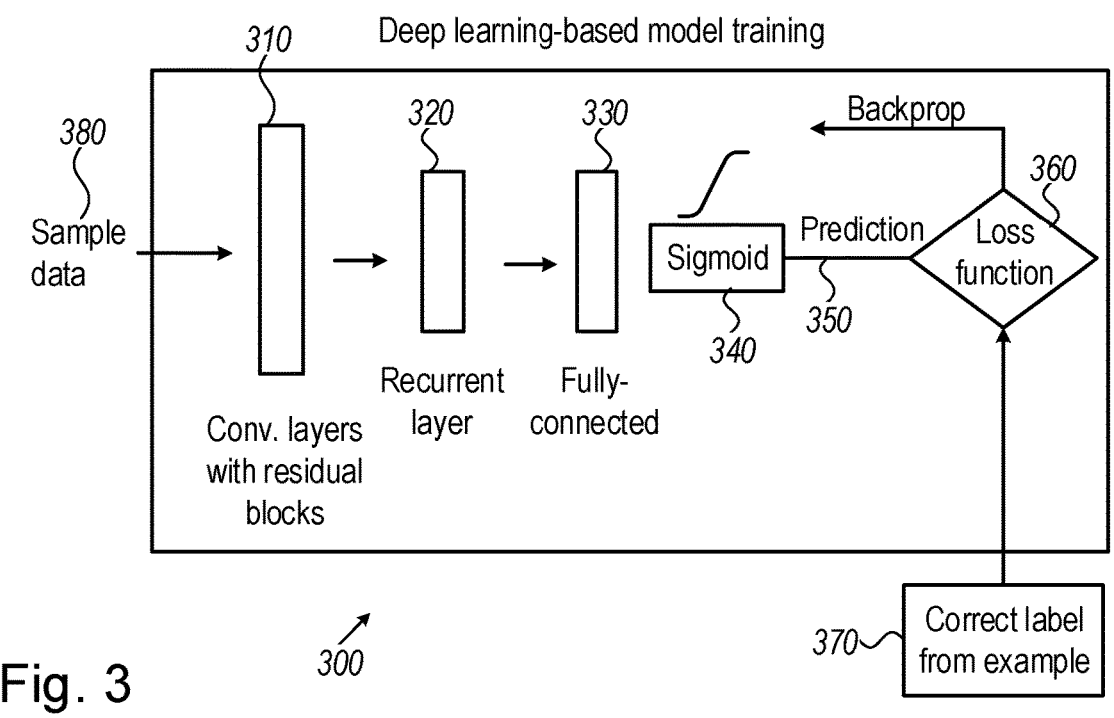
FIG. 3 depicts a deep learning neural network (NN) model during a training phase, according to some embodiments of the invention.

Reference is now made to FIG. 3, which depicts a DL NN model 300 during a training phase, according to some embodiments of the invention. The model presented in FIG. 3 is an example only, other models may be used. DL NN model 300 may be trained to classify samples as pertaining to or belonging to a first class or a second class. For example, DL NN model 300 may be trained to classify voice samples, or feature sets of voice samples, as genuine or spoof, and may be used by classifier 220 for this purpose. DL NN model 300 may be trained and used for other classification tasks.

DL NN model 300 may include convolutional layers with residual blocks 310, a recurrent layer 320, a fully connected layers 330 and an output layer 340. DL NN model 300 may obtain a training dataset including labeled samples. A labeled sample may include sample data 380 and a label 370. Label 370 of a sample may indicate or describe whether the sample pertains to a first class or a second class. For example, a label of '1' (one) may indicate that the sample pertains to the first class, and a label of '0' (zero) may indicate that the label pertains to the second class. Other labels may be used.

A loss function 360 may obtain the predictions 350 of DL NN model 300 and the label 370 (e.g., spoofing or genuine label) and may adjust or tune weights and parameters of DL NN model 300 through a backpropagation training scheme. According to embodiments of the invention, loss function 360 may include a regulation factor, where the regulation factor is set to zero for data samples labeled as pertaining or belonging to the first class and is proportional to the prediction 350 of DL NN model 300 for data samples labeled as pertaining to the second class. According to embodiments of the invention, in some implementations the regulation factor is directly proportional to prediction 350 of DL NN model 300 for data samples labeled as pertaining to the second class, and in some implementations, the regulation factor is inversely related to prediction 350 of DL NN model 300 for data samples labeled as pertaining to the second class. Thus, the regulation factor and loss function may be biased, and embodiments of the invention may adjust the model weights more significantly for a false negative classification (e.g., a sample labeled as pertaining to the first class that is classified as pertaining to the second class) comparing to the adjustments to the model weights made after false positive classification (e.g., a sample labeled as pertaining to the second class that is classified as pertaining to the first class).

In one embodiment, DL NN model 300 may obtain or have input to it a training dataset including labeled feature sets extracted from net-speech samples, e.g., each sample may include a set of features extracted by block 220 and a label. A label of set of features may indicate whether the sample is spoof or genuine. A spoof sample may either include voice recording (e.g., instead of live speech) or synthetic speech.

According to embodiments of the invention, the loss function may include a regulation factor, for example, the regulation factor may be added to a standard loss function (e.g., a cross-entropy function or other standard loss function). According to embodiments of the invention, the regulation factor may be set to zero for voice samples labeled as genuine and may be proportional (e.g., directly proportional) to the prediction of DL NN model 300 for data samples labeled as spoofing.

For example, prediction 350 may be a score between 0 and 1, e.g., a result of sigmoid function 340, and the label may be 0 for spoofing, and 1 for a genuine caller, such that the prediction is that the input is more likely to be genuine the closer the prediction is to 1. For clarity, classifying spoofing conversations as genuine will be referred to herein as false negative classification, and classifying genuine conversations as spoofing will be referred to herein as false positive classification. According to embodiments of the invention, it is desirable to adjust the model weights more significantly for a false negative classification comparing to the adjustments to the model weights made after false positive classification. In this example, the regulation factor is directly proportional to the prediction of the neural network for data samples labeled as spoofing. For example, the regulation factor may be:

$$\text{regulation\_factor} = (1 - y_{true}) * f(y_{pred})$$

Where $y_{pred}$ is prediction 350 and $y_{true}$ is the label, and where f is a monotonically increasing function that is bounded between 0-1, e.g., identity function, tanh ( ), etc. Accordingly, the loss function may be:

$$\text{Loss\_function} = -\Sigma y_{true}(i) * \log(y_{pred}(i)) + (1 - y_{true}) * f(y_{pred})$$

Where i is the training sample number or identifier.

In a second example, prediction 350 may be a score between 0 and 1, e.g., a result of sigmoid function 340, and the label may be 1 for spoofing, and 0 for a genuine caller. Here, the regulation factor may be inversely related to the prediction of DL NN model 300 for samples labeled as spoofing, and may equal, for example:

$$\text{regulation\_factor} = y_{true} * g(y_{pred})$$

Where g is a monotonically decreasing function that is bounded between 0-1, and the loss function may be:

$$\text{Loss\_function} = -\Sigma y_{true}(i) * \log(y_{pred}(i)) + y_{true} * gg(y_{pred})$$

Figure 4:
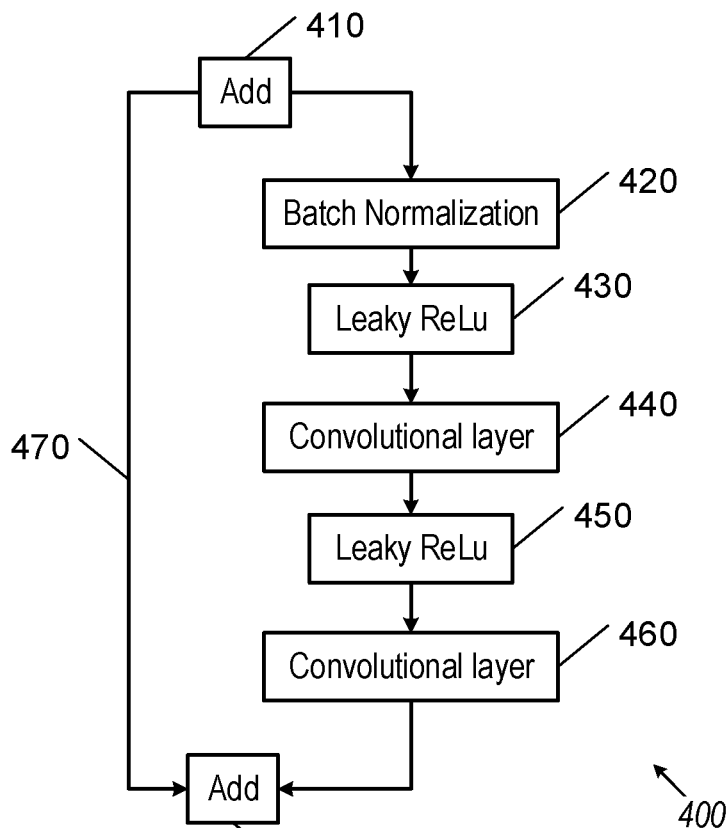
FIG. 4 depicts an example of a single residual block of convolutional layers of a NN with residual blocks, according to embodiments of the invention.

FIG. 4 depicts an example of a single residual block 400 of convolutional layers and residual blocks 310, according to embodiments of the invention. According to some embodiments, convolutional layers and residual blocks 310 may include a plurality of residual blocks 400, e.g., 10, 12, 14 or other number of residual blocks 400. In this example, residual block 400 may include batch normalization layer 420, Leaky ReLu 430, convolutional layer 440, a second Leaky ReLu 450, a second convolutional layer 460, and an adder 480 to add the results of convolutional layer 460 with the results of the previous residual block, connected via an identity connection 470. FIG. 4 presents adder 410 of a previous residual block 400 as well. Other structures may be used.

Returning to FIG. 3, convolutional layers and residual blocks 310 may extract frame-level features from the set of features. Recurrent layer 320 may be employed to aggregate or unify extracted frame-level features into a single utterance-level feature. Recurrent layer 320 may be or may include gated recurrent layer, or other types of recurrent layer, e.g., long short-term memory (LSTM). Fully connected layers 330 may include at least two fully connected layers. In some embodiments, dropout may be performed on the fully connected layers to overcome overfitting. Dropout is a feature of a fully connected layer that randomly nulls some of the weights during the training. Dropout may be used to make the model more robust to new datasets. Output layer 340 may include a sigmoid neuron, to provide the model prediction. Other functions may be used in the output layer, e.g., a Softmax.

Figure 5:
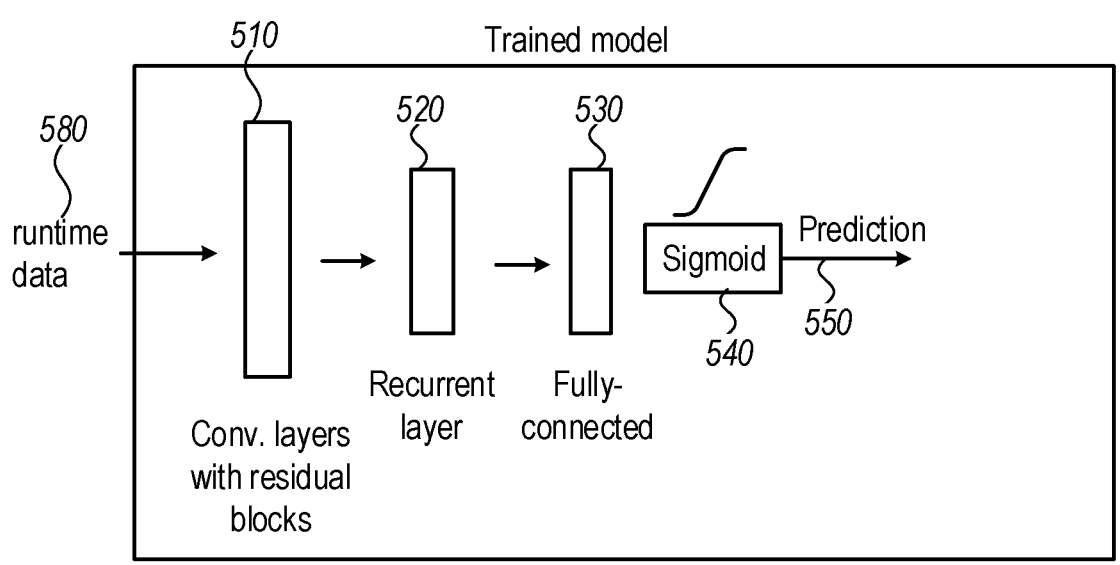
FIG. 5 depicts a trained DL NN model, including trained convolutional layers with residual blocks, recurrent layer, fully connected layers and output layer, according to embodiments of the invention.

FIG. 5 depicts the trained DL NN model 500, including trained convolutional layers and residual blocks 510, recurrent layer 520, fully connected layers 530 and output layer 540, according to embodiments of the invention. The model presented in FIG. 5 is an example only. Other models may be used. Trained DL NN model 500 may obtain runtime input data 580, e.g., feature set of a caller side of an interaction in call center 100, and may provide prediction 550, e.g., a classification of the interaction to spoofing or genuine.

Figure 6:
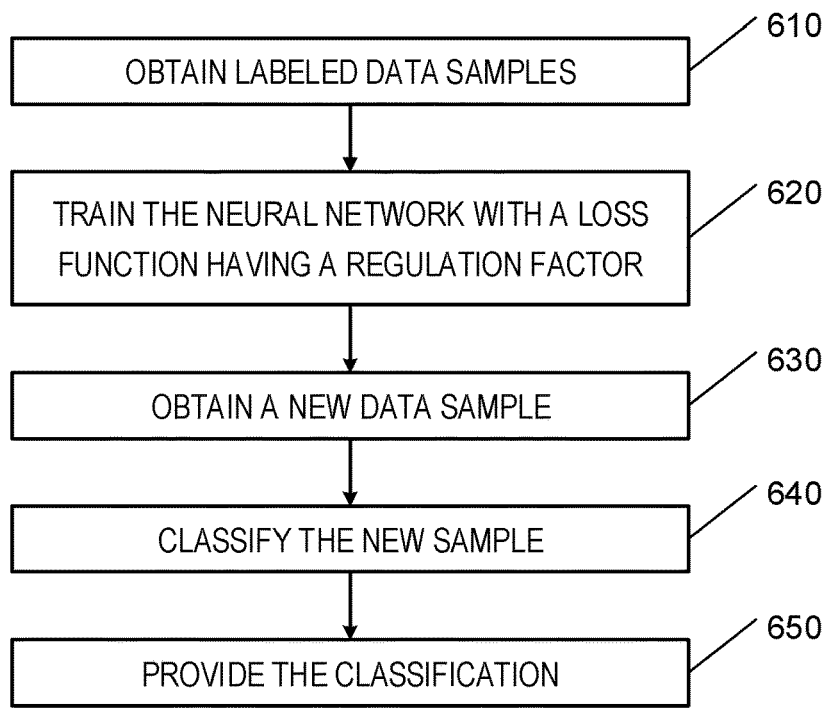
FIG. 6 shows a flowchart of a method for classification of data samples, according to embodiments of the present invention.

FIG. 6 shows a flowchart of a method for classification of data samples (e.g. voice recordings, voiceprints, or other representations of voice, or of other data), according to embodiments of the present invention. The operations of FIG. 6 may be performed by the systems described in FIGS. 1, 2 and 9, but other systems may be used. Operations 610 and 620 may be performed in a training stage, and operations 630-650 may be performed in runtime mode.

In operation 610, a processor (e.g., processor 105) may obtain labeled data samples and provide labeled data samples to a neural network model, e.g., to DL NN model 300. The data samples may be labeled as pertaining or belonging to a first class or a second class. In some embodiments, the data samples may be labeled by a human operator. In operation 620, the processor may train the neural network model by changing or adjusting at least one of the weights using a loss function that includes a regulation factor. The regulation factor may equal zero for data samples labeled as pertaining to the first class and may be proportional to the prediction of the neural network for data samples labeled as pertaining to the second class. In some embodiments, the regulation factor is directly proportional to the prediction of the neural network for data samples labeled as pertaining to the second class. In some embodiments, the regulation factor is inversely related to the prediction of the neural network for data samples labeled as pertaining to the second class. In some embodiments, the neural network model may include convolutional layers and residual blocks, a recurrent layer, a fully connected layer and an output layer. In some embodiments, training the neural network model may include performing dropout on the fully connected layers.

In operation 630, the processor may obtain a new data sample. In operation 640, the processor may classify the new data sample, using the neural network model trained in operation 620. In operation 650, the processor may provide the classification to a human operator, e.g., using output devices 140, or to another computerized process, as required.

Figure 7:
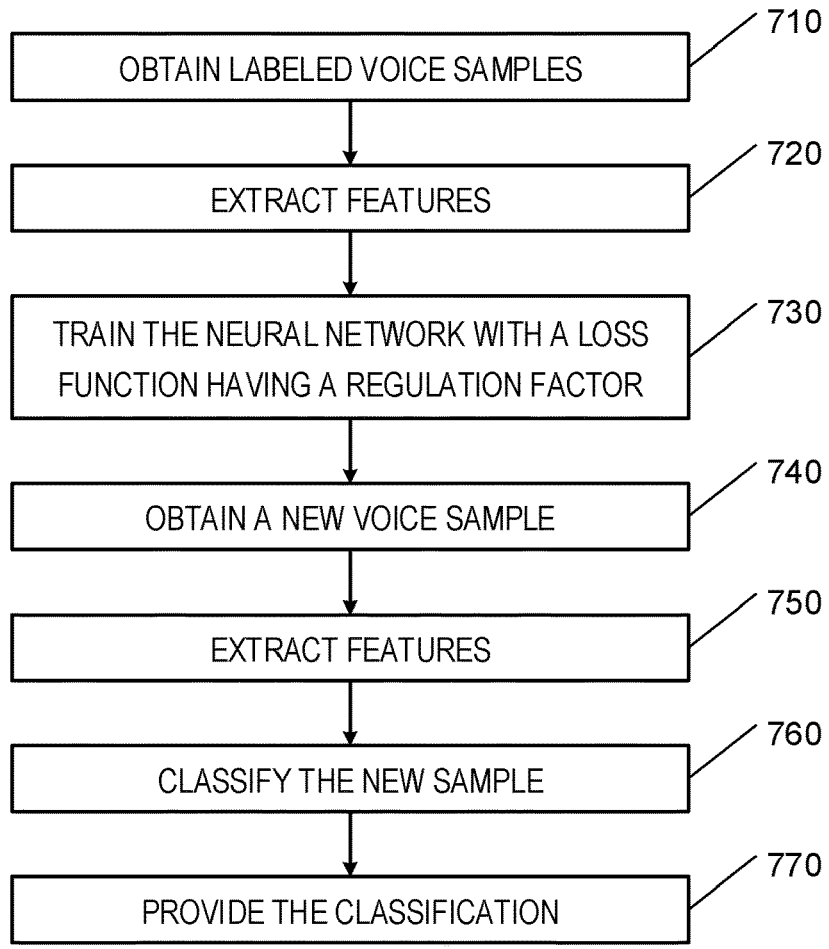
FIG. 7 shows a flowchart of a method for classification of voice samples to genuine voice samples or spoofing voice samples, according to embodiments of the present invention.

FIG. 7 shows a flowchart of a method for classification of voice samples to genuine voice samples or spoof voice samples, according to embodiments of the present invention. The operations of FIG. 7 may be performed by the systems described in FIGS. 1, 2 and 9, but other systems may be used. Operations 710-730 may be performed in a training stage, and operations 740-770 may be performed in runtime mode.

In operation 710, a processor (e.g., processor 105) may obtain labeled voice samples. The data samples may be labeled genuine or spoof. In some embodiments, the voice samples in the training dataset may be labeled by a human operator. In operation 720, the processor may extract a set of features from each the voice samples.

In operation 730, the processor may train a neural network model, e.g., to DL NN model 300, by providing the labeled voice samples to the neural network model. The processor may change or adjust at least one of the weights using a loss function that includes a regulation factor. The regulation factor may equal zero for data samples labeled genuine and may be proportional to the prediction of the neural network for data samples labeled as spoof. In some embodiments, the regulation factor is directly proportional to the prediction of the neural network for data samples labeled as spoof. In some embodiments, the regulation factor is inversely related to the prediction of the neural network for data samples labeled as spoofing. In some embodiments, the neural network model may include convolutional layers and residual blocks, a recurrent layer, a fully connected layer and an output layer. In some embodiments, training the neural network model may include performing dropout on the fully connected layers.

In operation 740, the processor may obtain a new voice sample. The voice sample may be a recording of the caller side of an interaction between a caller and an agent in a call center. For example, an interaction may take place in a call center; for example, a person (e.g., a speaker external to the organization, the caller) may engage in a telephone call with an agent at a call center (the agent typically internal to the organization, e.g., the call center) regarding a certain account. The interaction itself may be recorded (to provide an audio recording of the call), as well as data describing the interaction, such as metadata. The new voice sample may include a part or all of the caller side in the audio recording of the interaction.

In operation 750, the processor may extract a set of features from the new voice sample. In operation 760, the processor may classify the new voice sample, using the neural network model trained in operation 730. For example, the processor may provide the set of features to the trained neural network model that may provide a score indicative of the chances of the voice sample being genuine or spoof. The score may be compared against a threshold to provide a classification. In operation 770, the processor may provide the classification to a human operator, e.g., via analyst terminal 14, or to another computerized process, as required.

Figure 8:
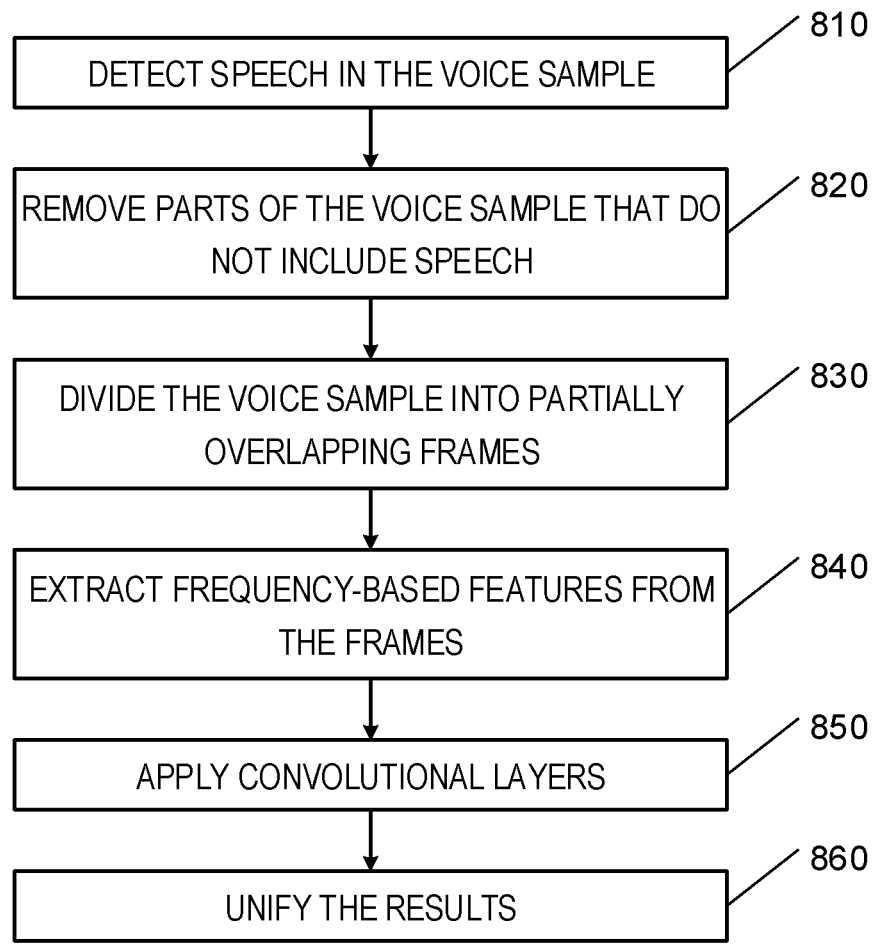
FIG. 8 shows a flowchart of a method for extracting a set of features from a voice sample, according to embodiments of the present invention.

FIG. 8 shows a flowchart of a method for extracting a set of features from a voice sample, according to embodiments of the present invention. The operations of FIG. 8 may be performed by the systems described in FIGS. 1, 2 and 9, but other systems may be used.

In operation 810, a processor (e.g., processor 105) may detect speech in the voice sample, e.g., using VAD. In operation 820, the processor may remove parts of the voice sample that do not include speech, to generate a sample that is long enough (e.g., above 3 seconds) and includes only voiced parts. In operation 830, the processor may divide the voice sample into partially overlapping frames of a predetermined size, e.g., 200-600 samples. In operation 840, the processor may extract frequency-based features from the frames, e.g., by performing fast Fourier transform (FFT). In operation 850, the processor may apply convolutional layers on the frequency-based features. In operation 860, the processor may unify the results of the convolutional layers to obtain the set of features, e.g., using recurrent layers.

Embodiments of a method for classification of voice samples to genuine voice samples or spoof voice samples were tested in real world settings. Datasets of labeled voice samples were used for training and testing a spoofing detection engine, e.g., spoofing detection engine 40. A threshold has been determined by providing a large number of genuine calls (e.g., at least 1000) to the trained spoofing detection engine, sorting the model scores in ascending order, and choosing the score in the bottom 0.001% as a threshold (for example, if the dataset included only 1000 samples the smallest score was selected as a threshold). Thus, in this test a score that equals or is above the threshold may be classified as genuine and a score below the threshold may be classified as spoof. Five datasets of voice samples were tested, each including 1000-2500 voice samples. The true positive rate (e.g., the present of detected spoof samples from the known number of spoof samples) was 70-90% on all datasets.

Reference is made to FIG. 9, showing a high-level block diagram of an exemplary computing device according to some embodiments of the present invention. Computing device 100 may include a processor 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Processor 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 1 may be or include devices such as computing device 100, and one or more devices such as computing device 100 may carry out functions such as those described in FIGS. 6-8. For example, verification server 38, agent terminals 30, analyst terminal 14, classifier block 220, a NN, and other modules may be implemented on or executed by a computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by processor 105 possibly under control of operating system 115. For example, executable code 125 may configure processor 105 to perform classification, spoofing detection, and perform other methods as described herein. Although, for the sake of clarity, a single item of executable code 125 is shown in FIG. 9, a system according to some embodiments of the invention may include a plurality of executable code segments similar to executable code 125 that may be loaded into memory 120 and cause processor 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as interactions, metadata, biometric system samples, parameters or thresholds may be stored in storage system 130 and may be loaded from storage system 130 into memory 120 where it may be processed by processor 105. Some of the components shown in FIG. 9 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, a smartphone or any other suitable computing device. A system as described herein may include one or more devices such as computing device 100.

When discussed herein, "a" computer processor performing functions may mean one computer processor performing the functions or multiple computer processors or modules performing the functions; for example a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for classification of data samples to a first class or a second class, the method comprising:
providing a neural network with data samples, each labeled as pertaining to the first class or the second class, wherein the neural network comprises a plurality of nodes organized into layers, with links between the nodes, and a plurality of weights, wherein each link comprises a weight among the plurality of weights; and
training the neural network by adjusting at least one of the weights using a loss function that comprises a regulation factor, wherein the regulation factor is set to zero for data samples labeled as pertaining to the first class and is proportional to a prediction of the neural network for data samples labeled as pertaining to the second class.

2. The method of claim 1, wherein the regulation factor is directly proportional to the prediction of the neural network for data samples labeled as pertaining to the second class.

3. The method of claim 1, wherein the regulation factor is inversely related to the prediction of the neural network for data samples labeled as pertaining to the second class.

4. The method of claim 1, wherein the data samples comprise features extracted from voice samples.

5. The method of claim 4, wherein the first class is genuine voice samples, and the second class is spoofing voice samples.

6. The method of claim 4, wherein extracting the features comprises:
obtaining a voice sample;
detecting speech in the voice sample;
removing parts of the voice sample that do not include speech;
dividing the voice sample into partially overlapping frames;
extracting frequency-based features from the frames;
applying convolutional layers on the frequency-based features;
and
unifying the results of the convolutional layers to obtain the set of features.

7. The method of claim 6, wherein unifying results of the convolutional layers is performed by recurrent layers.

8. The method of claim 1, wherein the neural network comprises fully connected layers.

9. The method of claim 8, wherein training the neural network comprises performing dropout on the fully connected layers.

10. The method of claim 1, comprising:
obtaining a new sample; and
obtaining a classification of the new sample to one of the first class or the second class by providing the new sample to the trained neural network.

11. A method for classification of voice samples to genuine voice samples or spoofing voice samples, the method comprising:
extracting a set of features from each of a plurality of voice samples, each voice sample labeled as genuine or spoof;
training a neural network having a plurality of nodes organized into layers, with links between the nodes, and a plurality of weights, wherein each link comprises a weight among the plurality of weights, with the sets of features, by adjusting at least one of the link weights using a loss function that comprises a regulation factor, wherein the regulation factor is set to zero for voice samples labeled as genuine and is proportional to a prediction of the neural network for data samples labeled as spoofing.

12. The method of claim 11, wherein extracting the features comprises:
detecting speech in the voice sample;
removing parts of the voice sample that do not include speech;
dividing the voice sample into partially overlapping frames;
extracting frequency-based features from the frames;
applying convolutional layers on the frequency-based features;
and
unifying the results of the convolutional layers to obtain the set of features.

13. The method of claim 11, comprising:
obtaining a new voice sample;
extracting a set of features from the new voice sample; and
classify the new voice sample by providing the set of features of the new voice sample to the trained neural network.

14. A system for classification of data samples to a first class or a second class, the system comprising:
a memory; and
a processor configured to:
provide a neural network with data samples, each labeled as pertaining to the first class or the second class, wherein the neural network comprises a plurality of nodes organized into layers, with between the nodes, and a plurality of weights wherein each link of comprises a weight among the plurality of weights; and
train the neural network by adjusting at least one of the link weights using a loss function that comprises a regulation factor, wherein the regulation factor is set to zero for data samples labeled as pertaining to the first class and is proportional to a prediction of the neural network for data samples labeled as pertaining to the second class.

15. The system of claim 14, wherein the regulation factor is directly proportional to the prediction of the neural network for data samples labeled as pertaining to the second class.

16. The system of claim 14, wherein the regulation factor is inversely related to the prediction of the neural network for data samples labeled as pertaining to the second class.

17. The system of claim 14, wherein the processor is configured to extract features from voice samples, and wherein the data samples comprise the features.

18. The system of claim 17, wherein the first class is genuine voice samples, and the second class is spoofing voice samples.

19. The system of claim 17, wherein the processor is configured to extract the features by:
obtaining a voice sample;
detecting speech in the voice sample;
removing parts of the voice sample that do not include speech;
dividing the voice sample into partially overlapping frames;

extracting frequency-based features from the frames;
applying convolutional layers on the frequency-based features;
and
unifying the results of the convolutional layers using recurrent layers to obtain the set of features.

20. The system of claim 14, wherein the processor is configured to:
obtain a new sample; and
obtain a classification of the new sample to one of the first class or the second class by providing the new sample to the trained neural network.

\* \* \* \* \*